United States Patent [19]

Dupuy

[11] Patent Number: 5,048,974

[45] Date of Patent: Sep. 17, 1991

[54] TEMPERATURE MEASURING DEVICE INCLUDING AN ALARM CONTACT

[75] Inventor: Christian Dupuy, Nanterre, France

[73] Assignee: Jaeger, Levallois Perret, France

[21] Appl. No.: 346,536

[22] Filed: May 2, 1989

[30] Foreign Application Priority Data

May 9, 1988 [FR] France ................. 88 06214

[51] Int. Cl.⁵ .................. G01K 13/00; G08B 19/00
[52] U.S. Cl. ..................... 374/142; 337/107;
337/113; 340/594; 374/183; 374/205
[58] Field of Search ............... 374/205, 188, 183, 142;
340/449, 594; 337/107, 113

[56] References Cited

U.S. PATENT DOCUMENTS

| | | |
|---|---|---|
| 3,295,373 | 1/1967 | Boddy . |
| 3,840,834 | 10/1974 | Obenhaus et al. ............. 337/107 X |
| 4,174,511 | 11/1979 | Knapp et al. ................. 337/107 |
| 4,394,646 | 7/1983 | Gossler ......................... 340/594 |
| 4,526,481 | 7/1985 | Hansen ........................ 374/183 X |
| 4,842,419 | 6/1989 | Nietert ......................... 337/107 X |

FOREIGN PATENT DOCUMENTS

| | | |
|---|---|---|
| 0203858 | 3/1986 | European Pat. Off. . |
| 3119681 | 1/1983 | Fed. Rep. of Germany . |
| 1349369 | 12/1963 | France . |

*Primary Examiner*—Daniel M. Yasich

[57] ABSTRACT

The present invention relates to a temperature measuring device including an alarm contact, in particular for motor vehicles, the device comprising a housing (10) which receives a bimetallic strip (20) and a thermoresistive element (150). According to the invention, a support (100) of electrically insulating material is provided to carry a contact stud (160), a contact blade (170), the thermoresistive element (150) interposed between the contact stud (160) and the contact blade (170), and a spring element (180), all in the form of a unitary module.

10 Claims, 5 Drawing Sheets

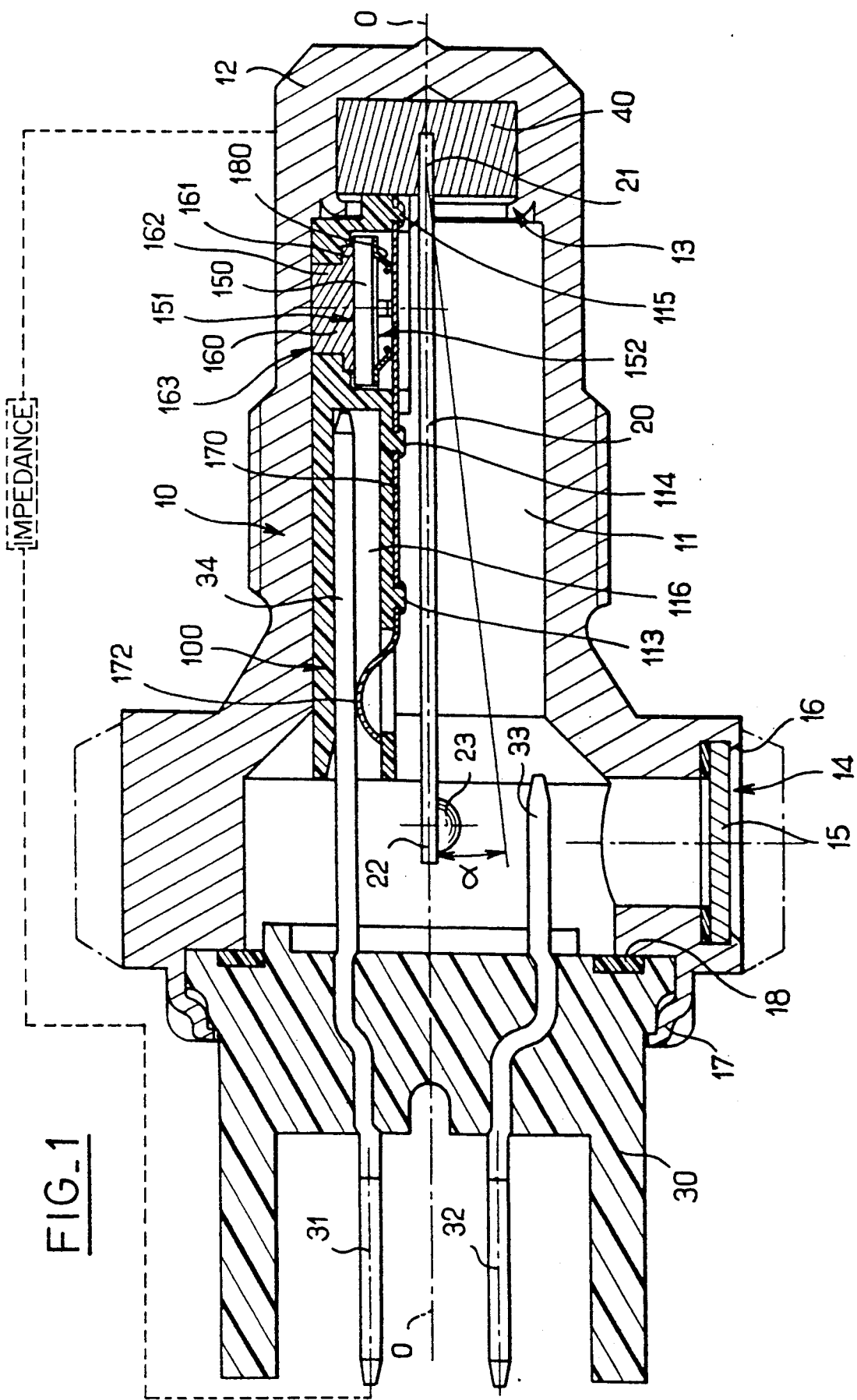
FIG_1

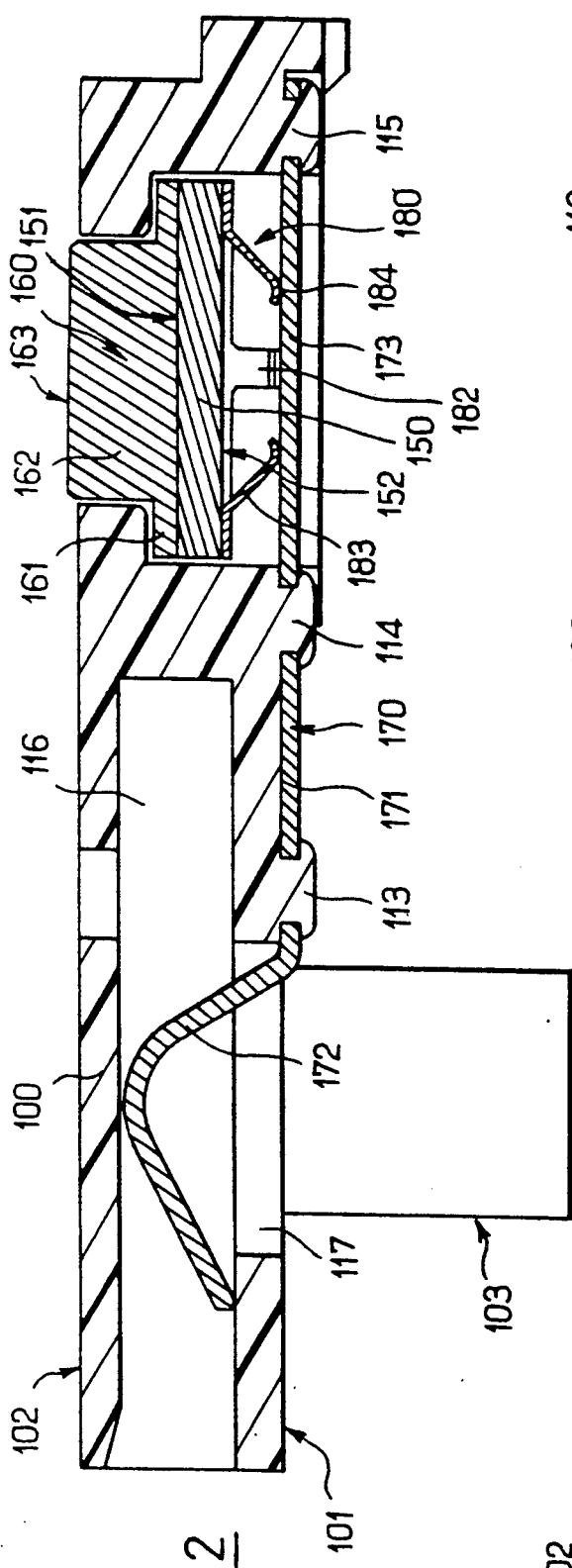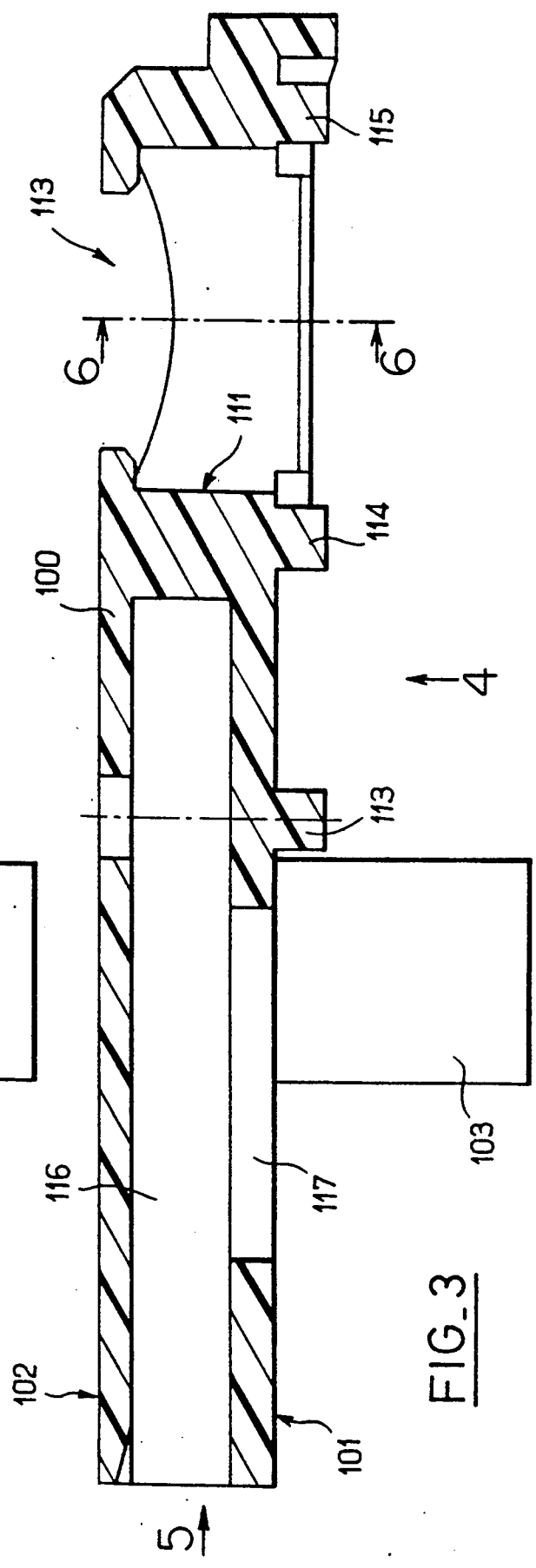

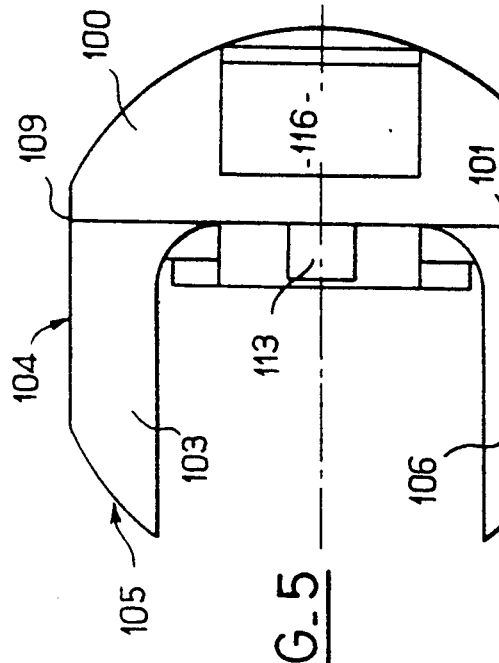
FIG._5
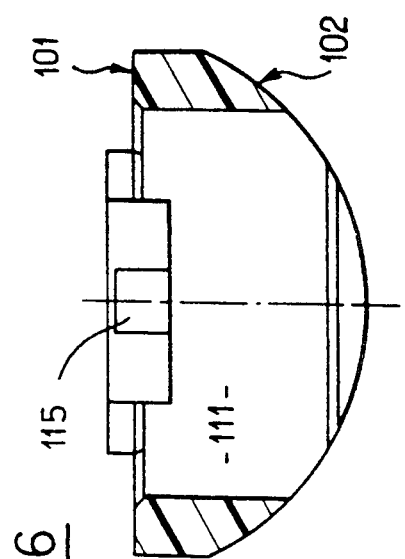
FIG._6
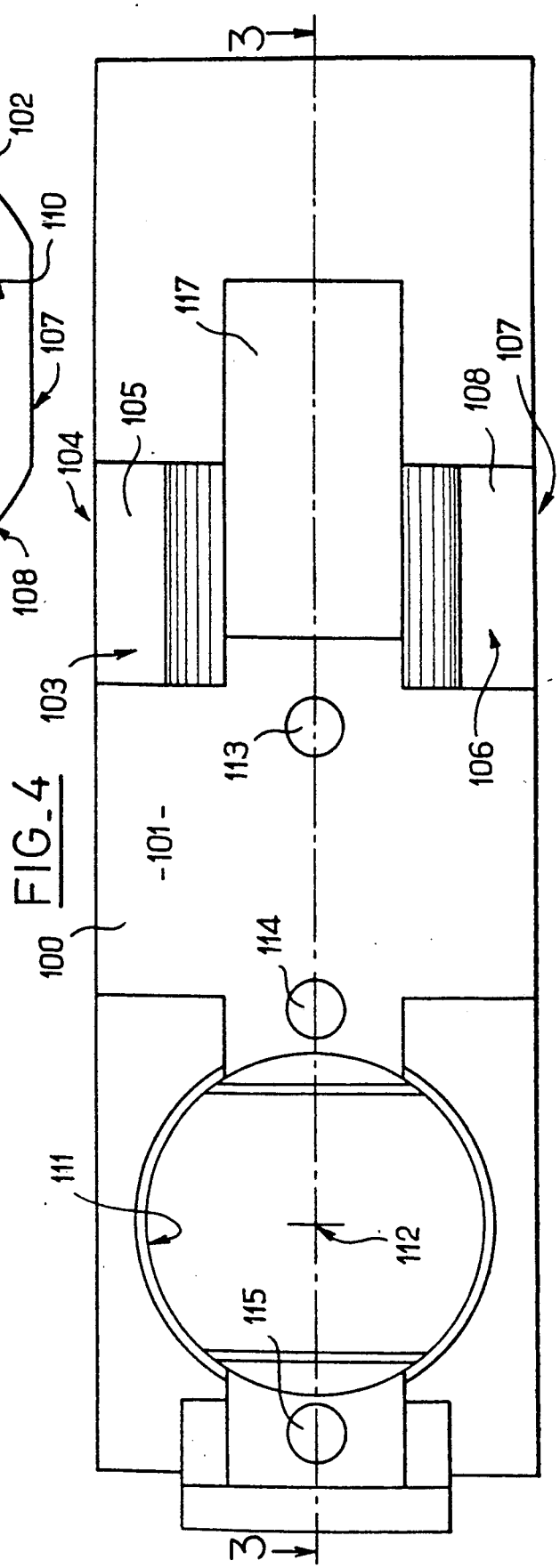
FIG._4

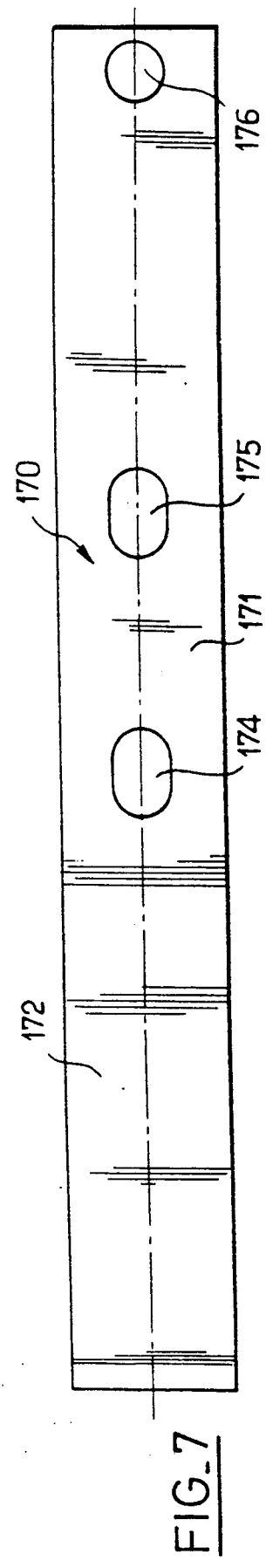
FIG_7
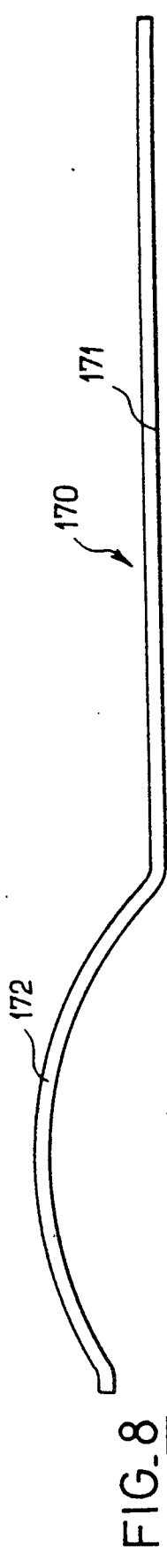
FIG_8
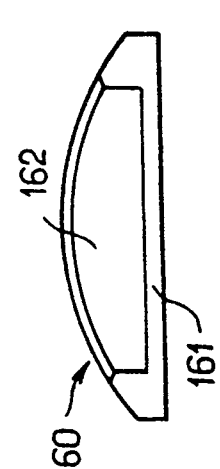
FIG_11
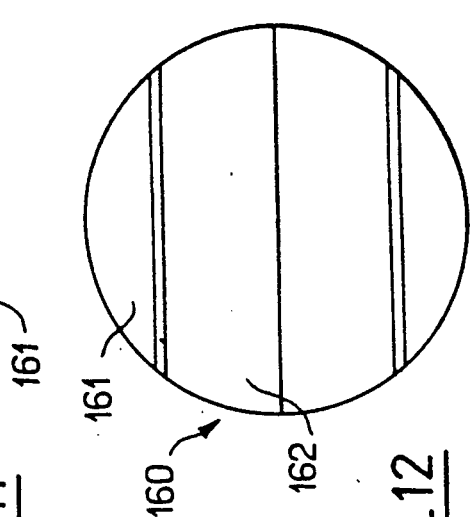
FIG_12
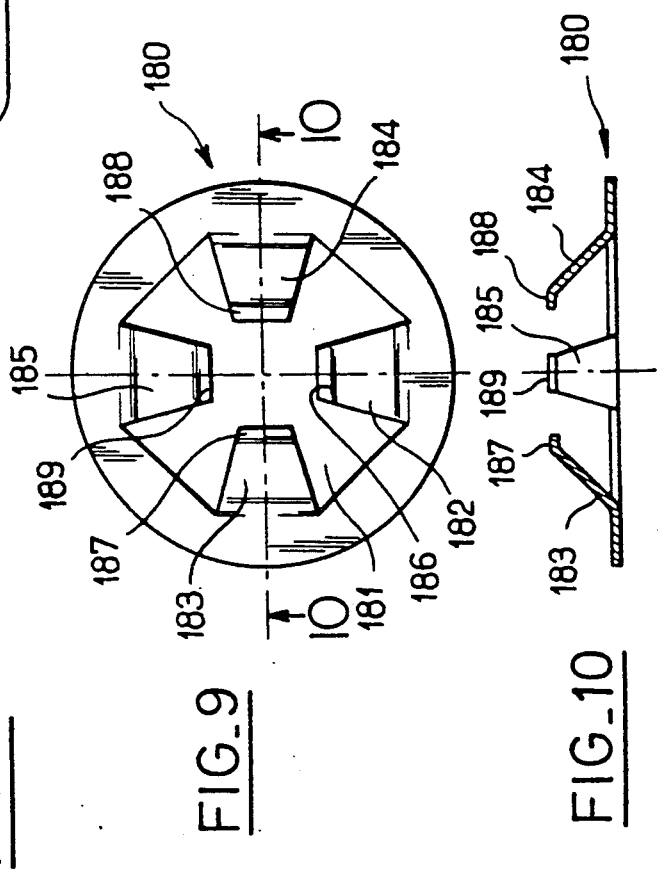
FIG_9
FIG_10

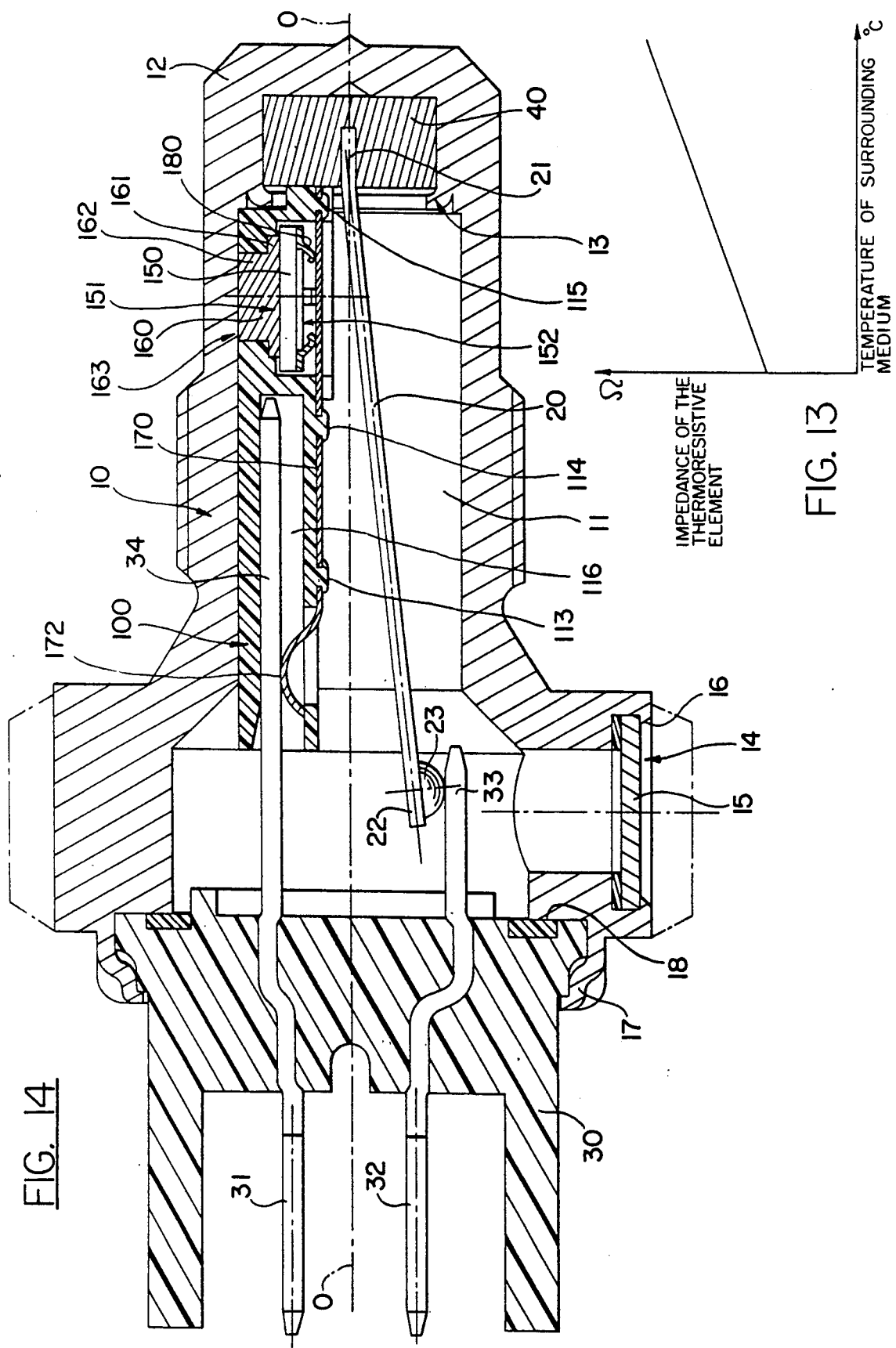

TEMPERATURE MEASURING DEVICE INCLUDING AN ALARM CONTACT

The present invention relates to a temperature measuring device including an alarm contact, in particular for motor vehicles.

BACKGROUND OF THE INVENTION

The object of the present invention is to improve the devices described in French patent application number FR-A-2 582 398 in the name of the present Applicant, said devices being of the type comprising an elongate housing made of thermally and electrically conductive material receiving a bimetallic strip constituting an alarm contact fixed to the end of the housing, and a thermoresistive element for measuring temperature and disposed laterally relative to the bimetallic strip.

The term "thermoresistive element" is used herein to designate any device whose resistance varies as a function of temperature in a manner suitable for measuring temperature. The coefficient relating resistance to temperature may be positive or negative.

More precisely, the object of the present invention is firstly to facilitate assembly of such devices and secondly to prevent any unwanted thermal interaction between the thermoresistive element and the bimetallic strip. The Applicant has observed that in some configurations the current flowing in the bimetallic strip may heat the thermoresistive element by means of the Joule effect, thereby distorting the temperature measurements to be performed, or that the detection current passing through the thermoresistive element could offset the switching point of the bimetallic strip, again by the Joule effect.

SUMMARY OF THE INVENTION

The above-mentioned objects are achieved in the present invention by means of a measuring device of the above-specified type, characterized in that it includes, inside the housing, a support of electrically insulating material which carries the following in the form of a unitary module:

a contact stud of thermally and electrically conductive material which emerges to the outside of the support in order to make electrical contact with the housing and to provide heat exchange therewith;

a contact blade suitable for co-operating with an insulated electrical contact carried by the housing;

a thermoresistive element interposed between the contact stud and the contact blade; and a spring element acting to guarantee good electrical and thermal contact between the contact stud and the thermoresistive element, and good electrical contact between the contact blade and the thermoresistive element.

In the context of the present patent application, the term "unitary module" designates a module combining various parts which were initially separate, which have been assembled to occupy predetermined relative positions, and in which there is no risk of the parts becoming accidentally separated during handling.

BRIEF DESCRIPTION OF THE DRAWINGS

An embodiment of the invention is described by way of example with reference to the accompanying drawings, in which:

FIG. 1 is a diagrammatic longitudinal axial section through a device in accordance with the present invention;

FIG. 2 is a diagrammatic longitudinal axial section through a unitary module in accordance with the present invention;

FIG. 3 is a similar longitudinal axial section through the support of the above-mentioned module, prior to assembly;

FIG. 4 is a side view of the support as seen looking along an arrow referenced IV in FIG. 3;

FIG. 5 is an end view of the support as seen looking along an arrow referenced V in FIG. 3;

FIG. 6 is a cross-section through the support on a section plane referenced VI—VI in FIG. 3;

FIGS. 7 and 8 are two orthogonal side views of the contact blade integrated in the module of the present invention;

FIGS. 9 and 10 are respectively a plan view and a section view on a plane referenced X—X in FIG. 9 showing a spring element integrated in the module of the present invention; and FIGS. 11 and 12 are two orthogonal views of the contact stud integrated in the module of the present invention.

FIG. 13 is a diagram showing the relationship of the impedance of the thermoresistive element versus temperature characteristic from which characteristic the temperature measurement function of the present invention is carried out.

FIG. 14 is a diagrammatic longitudinal axial section of the device in accordance with the present invention as illustrated in FIG. 1 showing the movement of the bimetallic strip as a result of an increase in temperature to provide the electrical continuity through the device which is used to activate the alarm function.

DETAILED DESCRIPTION

The temperature measuring device including an alarm contact and in accordance with the present invention, comprises a housing 10 made of a material which is electrically and thermally conductive. The housing 10 includes a generally cylindrical blind internal chamber 11. The axis of the chamber 11 is referenced O—O. The chamber 11 receives a bimetallic strip 20 and a thermoresistive element 150.

The chamber 11 is closed by a cap 30 made of an electrically insulating material and which also serves as a support for contact blades 31 and 32. These blades extend substantially parallel to the axis O—O of the housing and they pass through the cap 30. The contact blades 31 and 32 are therefore accessible from outside the cap, and they also extend a considerable distance inside the chamber 11 of the housing.

As shown in FIG. 1, the bimetallic strip 20 extends along the length of the chamber 11, i.e. substantially along the axis O—O.

A first end 21 of the bimetallic strip 20 is fixed, preferably by crimping, to an electrically conductive support 40. The support 40 is in turn fixed against the end 12 of the housing, e.g. by crimping as shown at 13 in FIG. 1.

The free end 22 of the bimetallic strip 20 carries a contact-making tip 23 facing the end 33 of contact blade 32 located inside the chamber 11. The relative position of the bimetallic strip 20 and of the contact blade 32 is determined in such a manner that the state of the electrical connection between the bimetallic strip and the contact blade 32 changes when the temperature of the medium surrounding the housing 10 and detected by the bimetallic strip 20 via the support 40 reaches an alarm threshold.

It may be observed that the temperature threshold can be detected either by the electrical connection between the bimetallic strip 20 and the contact blade 32 closing as shown in FIG. 14 (in which case the electrical connection is open so long as the temperature is beneath the alarm temperature as shown in FIG. 1), or else by the electrical connection between the bimetallic strip 20 and the contact blade 32 opening (in which case the electrical connection is closed while the temperature is below the alarm temperature).

In FIG. 1, reference α represents the angle through which the bimetallic strip may move due to an increase in temperature.

In order to facilitate adjusting the position of the end 33 of contact blade 32 relative to the pellet 23 by folding the blade, the housing 10 is provided with a window 14 looking onto said end 33. The window 14 makes it possible to obtain access to the end 33 of contact blade 32 from outside the housing after the cap 30 has been assembled to the housing 10, thereby making it possible to bend or fold the blade appropriately. After such an adjustment has been made, the window 14 is closed by a cover 15 which is fixed to the housing 10 by crimping, as shown at 16.

On examining FIG. 1, it will be observed that the cap 30 is fixed to the housing 10 by crimping at 17 after a sealing ring 18 has been interposed between the cap and the housing.

As mentioned above, according to an essential characteristic of the invention, the thermoresistive element 150 is carried by a support 100 in association with a contact stud 160, a contact blade 170, and a spring 180, all in the form of a unitary module. The support is constituted by an elongate piece of electrically insulating plastic material, e.g. a molded polyamide.

The part 100 essentially comprises a semi-cylindrical envelope delimited by a plane base wall 101 and a semi-cylindrical wall 102, together with two resilient tabs 103 and 106. The tabs project from the base surface 101 substantially parallel to each other and perpendicular to said base surface 101. The tabs 103 and 106 are flush with the longitudinal free edges 109 and 110 corresponding to the intersection between the base surface 101 and the semi-cylindrical surface 102. Preferably, as shown in accompanying FIG. 5, the outer surfaces 104 and 107 of the tabs 103 and 106 are constituted by flats which are parallel to each other and perpendicular to the base surface 101. However, the free ends of the tabs 103 and 106 are delimited by cylindrical sectors 105 and 108 of substantially the same radius as the semi-cylindrical surface 102. It should also be observed that the radius of curvature of said semi-cylindrical surface 102 is the same as the radius of curvature of the internal chamber 11 inside the housing 10.

The tabs 103 and 106 serve to hold the support 100 resiliently in position inside the internal chamber 11 when the support is engaged therein.

The thermoresistive element 150 is preferably in the form of a disk having two circular plane base surfaces 151 and 152 constituting respective terminals of the thermoresistive element 150.

This element is received in a complementary cylindrical chamber 111 provided in the support 100. The chamber 111 opens out into the plane base surface 101. Its axis 112 is perpendicular to the surface of the plane base 101 and it intersects the axis O—O, after assembly.

The chamber 100 also opens out into the semi-cylindrical surface 102 via an opening 113 of smaller section. The opening 113 is intended to receive the contact stud 160 such that the stud emerges to the outside of the support 100 as shown, for example, in FIG. 2, thereby making electrical contact with the housing 10 and also ensuring heat exchange therewith.

In order to keep the contact stud 160 against the support 100, i.e. in order to avoid the contact stud 160 falling out while the device is being assembled, it is preferable for the contact stud 160 to be in the form of a cylindrical base 161 which is complementary to the chamber 111, together with a projecting core 162 whose cross-section is complementary to that of the opening 113. The height of the core 162 relative to the base 161 is determined in such a manner that when the base 161 rests against the bottom of the chamber 111, the top surface 163 emerges through the semi-cylindrical surface 102. It may be observed that in order to ensure good contact, both electrical and thermal, between the contact stud 160 and the housing 10 it is preferable for the top surface 163 of the core 162 to be cylindrical in appearance and to have the same radius as the internal chamber 11 in the housing 10.

The contact blade 170 is made of an electrically conductive material, e.g. a copper-based alloy. It is fixed to the support 100 facing its plane base surface 101. The contact blade 170 essentially comprises an elongate rectilinear body 171 having a curved portion 172 at one end.

It may be observed that the other end 173 of the contact blade 170 extends across the chamber 111. Preferably, the contact blade 170 is fixed to the support 100 by ultrasonic welding.

To do this, the contact blade 170 is provided with a plurality of openings 174, 175, and 176 distributed along its length and receiving respective pegs 113, 114, and 115 projecting from the plane base surface 101 of the support and intended to be deformed in conventional manner by the application of ultrasound, as shown in FIG. 2, for the purpose of holding the contact blade 170 in place.

The curved end 172 of the contact blade 170 is intended to be received in a blind channel 116 provided in the support 100. The channel 116 runs parallel to the axis O—O of the housing, i.e. parallel to the axis of revolution of the semi-cylindrical surface 102. It opens out at that end of the support 100 which faces the cap 30. The curved end 172 of the contact blade 170 is inserted into the channel 116 via a slot 117 connecting the channel 116 to the plane base surface 101 of the support.

Thus, the contact blade 170 can make electrical contact with the contact blade 31 via its curved end 172 when the cap 30 is put into place on the housing 10, and the inside end 34 of the contact blade 31 is engaged inside the channel 116.

In the embodiment shown in the accompanying drawings, the spring element 180 is in the form of a separate part interposed between the contact blade 170 and the base plane surface 152 of the thermoresistive element 150. The spring element 180 is made of an electrically conductive material, e.g. a copper-based alloy.

More precisely, as shown in accompanying FIGS. 9 and 10, the spring element 180 is in the form of a washer having a central cut-out 181 which defines a plurality of tongues 182, 183, 184, and 185 extending generally radially, being connected to the body of the washer 180 at their radially outer ends, and being free at their radially inner ends. After the central cut-out 181 has been formed, the tongues 182, 183, 184, and 185 are folded where they join the body of the washer 180 so as to take up a sloping position relative to the average plane of the washer. The positions thus obtained for the tongues 182, 183, 184, and 185 is shown, for example, in FIG. 10.

It may be observed that after the above-mentioned folding in order to deflect the tongues 182 to 185 away from the average plane of the washer 180, the bodies of these tongues remain plane. The Applicant has discovered that such plane tongues 182 to 185 are more flexible than the tongues of spherical appearance shown in FIGS. 7 to 9 of above-mentioned French patent application FR-A-2 582 398.

Further, and preferably, as shown in accompanying FIG. 10, the radially inner free ends of the tongues 182 to 185 are folded a second time to form sections 186 to 189 which are coplanar and parallel to the body of the washer 180. These coplanar sections 186 to 189 serve to raise the contact surface between the spring element 180 and the contact blade 170, thereby improving the reliability of the electrical contact between these two elements.

The above-described device as shown in the accompanying figures is assembled as follows.

Initially, the support 40 fitted with the bimetallic strip 20 is inserted in the housing 10 and is fixed against the end 12 of the housing by crimping at 13.

In parallel, the following are inserted in succession into the chamber 111 of a support 100: a stud 160, a thermoresistive element 150, and a spring element 180. Then a contact blade 170 is placed against the plane base face 101 of the support 100 and its curved end 172 is inserted into the channel 116 via the slot 117. The contact blade 170 is fixed to the support 100 by the pegs 113, 114, and 115, by applying ultrasound thereto. In this position, the contact stud 160 is resting via its base 161 against the bottom of the chamber 111. The thermoresistive element 150 has its base face 151 resting against said base 161. The opposite base face 152 of the thermoresistive element 150 rests against the body of the spring element 180. The radially inner free ends of the tongues 182 to 185 rest against the contact blade 170. The spring element ensures good electrical and thermal contact between the contact stud 160 and the thermoresistive element, and also good electrical contact between the thermoresistive element and the contact blade 170, via the spring 180.

The support 100 fitted out in this way constitutes a unitary module which is easy to handle and which can be inserted into the chamber 11 of the housing so as to be laterally adjacent to the bimetallic strip 20.

When the support 100 is engaged in the chamber 11, its tabs 103 and 106 bend elastically and serve to center and hold the support 100 resiliently inside the housing 10. The contact stud 160 which projects outside the support 100 rests against the inside surface of the housing 10. The contact stud 160 thus ensures that heat exchange takes place between the housing 10 and the element 150, such that the element 150 is at the same temperature as the medium surrounding the housing 10.

The cap 30 fitted with contact blades 31 and 32 can then be placed on the housing 10 by relative translation motion parallel to the axis O—O. While this is taking place, the inside end 34 of contact blade 31 engages in the channel 116 and makes electrical contact with the contact blade 170, and more precisely with the curved end 172 thereof. The cap 30 is then fixed to the body 10 by crimping at 17. The impedance value of the thermoresistive element 150 which is representative of the temperature of the medium surrounding the housing 10 (as indicated in FIG. 13) is determined by measuring the resistance between contact blade 31 and the housing 10. The housing 10 is connected to the first face of the base 151 of the element 150 via the contact stud 160. The contact blade 31 is connected to the second face 152 of the element 150 via the blade 170 and the spring element 180.

It may be observed that integrating the contact stud 160, the thermoresistive element 150, the spring element 180, and the blade 170 in the form of a unitary module in the support 100 greatly facilitates the operations involved in assembling the device.

Further, the disposition of the thermoresistive element 150 in the support 100 made of plastic material makes it possible to isolate the thermoresistive element 150 thermally from the bimetallic strip 20. Any thermal interaction between these two items is therefore avoided.

It may be observed that when the cap 30 is fixed to the housing 10, it is preferable for the inside end 34 of the contact blade 31 to rest against the longitudinal end of the channel 116 as shown in FIG. 1, thereby holding the support 100 axially in place inside the housing 10.

As mentioned above, it is recalled that the tabs 103 and 106 integer with the support 100 prevent the support from vibrating transversely relative to the axis O—O.

In conclusion, the operation of the temperature measuring device including an alarm contact in accordance with the present invention is summarized as follows. As indicated above, the contact stud 160 insures heat exchange between the housing 10 and the thermoresistive element 150 so that the element 150 is at the same temperature as the medium or ambient surrounding the housing 10 since the housing will be at the same temperature as the ambient due to natural thermal conductivity between the ambient and the housing. The thermoresistive element 150 has one face of its base 151 in contact with the housing 10 via the stud 160 while the contact blade 31 is electrically and physically connected to the second face 152 of the thermoresistive element 150 by the blade 170 and the spring element 180 providing the connection between the blade 170 and the face 152. Since the relationship of the impedance of the thermoresistive element 150 is known with respect to temperature, measuring the impedance between the housing 10 and the blade 31 provides means to determine the temperature surrounding the housing 10 as is known to those skilled in the art.

The alarm function of the device is actuated when the electrical connection between the bimetallic strip 20 and the contact blade 22 is changed between an electrically open and an electrically closed position. The bimetallic strip is connected to the housing 10 which is electrically conductive via the support 40 therefore providing continuity or a discontinuity between the blade 32 and the housing 10 which may be used to actuate an external indicating means as is known to those skilled in the art. Preferably, the electrical connection between the bimetallic strip 20 and the contact blade 32 is an open circuit condition as shown in FIG. 1 when the temperature is below the alarm temperature threshold and in an electrically closed connection as illustrated in FIG. 14 when the temperature reaches the alarm temperature threshold.

Naturally, the present invention is not limited to the particular embodiment described above but extends to any variant falling within its scope.

For example, in a variant, the spring 180 could be integrated with the contact blade 70, or alternatively with the contact stud 160.

Further, the support 100 could be integral with the cap 30.

I claim:

1. A temperature measuring device in particular for motor vehicles, said device comprising:
   an elongate housing made of thermally and electrically conductive material;
   a bimetallic strip received in said housing and fixed to an end of the housing;
   a cap made of an electrically insulating material fixed on said housing;
   a first contact blade made of an electrically conductive material supported by said cap, said first contact blade being placed in regard of said bimetallic strip so that the electrical connection between said bimetallic strip and said first contact blade changes when the temperature of the bimetallic strip reaches an alarm temperature;
   a second contact blade made of an electrically conductive material supported by said cap,
   a support made of an electrically insulating material received in the housing and which carries a unitary module comprising:
   a contact stud of thermally and electrically conductive material which emerges to the outside of the support in order to make electrical contact with the housing and to provide heat exchange therewith;
   a third contact blade suitable for electrically contacting said second contact blade carried by said cap fixed to the housing;
   a thermoresistive element interposed between the contact stud and the third contact blade; and
   a spring element acting to guarantee good electrical and thermal contact between the contact stud and the thermoresistive element, and good electrical contact between the third contact blade and the thermoresistive element, so that measuring the impedance between the housing and the second contact blade gives an indication of the temperature of a medium surrounding the housing.

2. A measuring device according to claim 1, wherein the spring element is integral with the third contact blade.

3. A measuring device according to claim 1, wherein the spring element is in the form of a part which is separate from said third contact blade.

4. A measuring device according to claim 1, wherein the spring element is integral with the contact stud.

5. A measuring device according to claim 1, wherein the spring element comprises a washer having a central cut-out defining a plurality of plane tongues which are folded to slope relative to the plane of the washer.

6. A measuring device according to claim 1, wherein the third contact blade is fixed on an outer face of the support by ultrasonic welding.

7. A measuring device according to claim 1, wherein the third contact blade is fixed on an outer face of the support and has one end engaged in a channel provided in the support in order to come into contact with the second contact blade carried by said cap fixed to the housing when said second contact blade is engaged in the channel.

8. A measuring device according to claim 1, wherein the support possesses a generally semi-cylindrical envelope with two resilient tabs projecting from its generally plane base surface.

9. A measuring device according to claim 1, wherein the support is fixed to said cap.

10. A measuring device according to claim 1, wherein the support is made by molding a plastic material.

* * * * *